United States Patent [19]
Niwa et al.

[11] Patent Number: 6,046,845
[45] Date of Patent: *Apr. 4, 2000

[54] SCREEN ASSEMBLY AND REFLEX TYPE SCREEN ASSEMBLY

[75] Inventors: Masatoshi Niwa; Hajime Maruta, both of Joetsu; Tomoshi Oozeki, Tokyo, all of Japan

[73] Assignee: Arisawa Mfg. Co., Ltd., Niigata-ken, Japan

[*] Notice: This patent is subject to a terminal disclaimer.

[21] Appl. No.: 09/093,781

[22] Filed: Jun. 9, 1998

[30] Foreign Application Priority Data

Jun. 13, 1997 [JP] Japan .................................. 9-157077

[51] Int. Cl.[7] .......................... G03B 21/56; G03B 21/58
[52] U.S. Cl. .......................................... 359/443; 359/461
[58] Field of Search ................................... 359/461, 443; 248/444.1, 464, 463; 206/169, 195, 180

[56] References Cited

U.S. PATENT DOCUMENTS

| | | | |
|---|---|---|---|
| 4,017,152 | 4/1977 | Allen | 350/117 |
| 4,050,658 | 9/1977 | Forman et al. | 248/13 |
| 4,110,003 | 8/1978 | Zinn | 350/117 |
| 4,169,658 | 10/1979 | Brown | 350/118 |
| 4,705,355 | 11/1987 | Espo | 350/117 |
| 5,581,401 | 12/1996 | Takamoto et al. | 359/443 |
| 5,706,130 | 1/1998 | Rosen | 359/443 |
| 5,791,624 | 8/1998 | Fedrick | 248/460 |
| 5,798,861 | 8/1998 | Doat | 359/461 |

FOREIGN PATENT DOCUMENTS

| | | | |
|---|---|---|---|
| 8-62727 | 3/1986 | Japan | G03B 21/62 |
| 8-29878 | 2/1996 | Japan | G03B 21/58 |
| 8-69057 | 3/1996 | Japan | G03B 21/58 |

*Primary Examiner*—Safet Metjahic
*Assistant Examiner*—Christopher E. Mahoney
*Attorney, Agent, or Firm*—Sughrue, Mion, Zinn, Macpeak & Seas, PLLC

[57] ABSTRACT

A reflex type screen assembly and a screen assembly which are simple in structure, low in cost, superior in durability, compact in size and superior in storage property and portability in comparison with the conventional example. The reflex type screen assembly, for reflecting a projection beam from a projecting device such as a projector is provided in which a screen winding receiver for winding and receiving a screen member having a flexibility is provided within a case member having a grip portion. A pair of screen support members for supporting the screen member when the screen member is drawn upwardly are pivoted on right and left sides of the case member, on the other hand, the leg members 6 are pivoted on the right and left sides of the case member. The leg members 6 are angularly moved downwardly to support and retain the case member.

16 Claims, 6 Drawing Sheets

SCREEN ASSEMBLY AND REFLEX TYPE SCREEN ASSEMBLY

BACKGROUND OF THE INVENTION

The present invention relates to a reflex type screen assembly and a screen assmebly which is portable or movable and simple in structure.

A collapsible screen assembly has recently been put into practice as a reflex type screen assembly for reflecting a projection light from a projecting device such as a projector as disclosed in Japanese Patent Application Laid-Open No. Hei 8-29878.

However, the screen assembly disclosed in Japanese Patent Application Laid-Open No. Hei 8-29878 (hereinafter, referred to as a conventional example) suffers from the following defects.

i) In the conventional example, the screen is drawn out by a frame bent up and down in a pantograph manner and the drawn screen is supported by the frame. However, in this type, there are many bent portions in the frame. The structure thereof is complicated. Large number of the parts is cause of increase of the cost. In addition, there is a fear that the bent portion would be damaged. Thus, the durability would be inferior.

ii) In the conventional example, since the screen is used under the condition that the receiver case is laid on the floor and the screen is drawn, the screen must be drawn at a rather high level position from the receiver case, and the vertical length of the screen must be more than necessary.

iii) In the conventional example as shown in FIG. 12, a screen winding receiver portion 32 for winding and receiving the screen member 31 within the receiver case 30 is provided, each screen support member 33 for supporting the screen member 31 drawn upwardly is provided on the side of the screen winding receiver portion 32. As a result, the width of the receiver case 30 is increased. Thus, the conventional example suffers from the problem that the storage space must be increased when the screen assembly is to be stored or it is difficult to carry the screen assembly when the screen assembly is to be carried. Incidentally, reference numeral 34 in FIG. 12 denotes a reinforcement bar for reinforcing the screen member 31.

SUMMARY OF THE INVENTION

In order to overcome the above-noted shortcomings, an object of the present invention is to provide a reflex type screen assembly and a screen assembly which are simple in structure, low in cost, superior in durability, compact in size and superior in storage property and portability in comparison with the conventional example.

According to the present invention, there is provided a screen assembly wherein a screen winding receiver portion for winding and receiving a screen member having a flexibility is provided within a case member. A pair of screen support members for supporting the screen member when the screen member is drawn upwardly are pivoted on right and left sides of the case member. The screen support members are located below the screen winding receiver portion when the screen support members are angularly moved to be attached to the case member.

Leg members are pivoted on the right and left sides of the case member. The leg members are angularly moved downwardly so that the case member may be supported and retained. Therefore, the screen support members and the leg members may be received in the case member.

Leg member support members are provided for respectively supporting and maintaining the leg members extending downwardly in a suspended condition. A first end of each leg member support member is pivoted on the case member in the vicinity of a pivot portion of the corresponding leg member. A second end of each leg member support member is retained at the corresponding leg member.

Each screen support member is provided to be extendable or retractable. A retainer mechanism for retaining an extension/retraction condition of each screen support member is provided to the screen support member.

A reinforcement rod member is provided at an upper end of each screen member. A screen retaining portion for being retained at each screen support member is provided at both ends of the reinforcement rod member.

A small diameter portion is provided at both ends of the reinforcement rod member so that both ends of the reinforcement rod member are formed into screen retainer portions. An inverted U-shaped receiver portion on which the screen retainer portion is laid, is provided at a tip end of each screen support member. A fit portion fitted to the small diameter portion laid on the receiver portion is provided to retain the small diameter portion in a pull-apart prevented condition.

A flat ground contact portion is provided on a bottom portion of the case member. The flat ground contact portion is provided as a discrete member from the case member.

It is a further object of the invention to provide a reflex type screen assembly for reflecting a projection beam from a projecting device such as a projector, wherein a screen winding receiver portion for winding and receiving a screen member having a flexibility is provided within a case member having a grip portion. A pair of screen support members for supporting the screen member when the screen member is drawn upwardly are pivoted on right and left sides of the case member. On the other hand, leg members are pivoted on the right and left sides of the case member. The leg members are angularly moved downwardly so that the case member may be supported and retained.

It is a further object of the invention to provide a reflex type screen assembly for reflecting a projection beam from a projecting device such as a projector, wherein a screen winding receiver portion for winding and receiving a screen member having a flexibility is provided within a case member having a grip portion. A pair of screen support members for supporting the screen member when the screen member is drawn upwardly are pivoted on right and left sides of the case member. Leg members extending downwardly are pivoted on right and left sides of the case member. The screen support members and the leg members are located below the screen winding receiver portion to be received in the case member and formed to have a length so as not to project from end portions of the case member when the screen support members and the leg members are pivoted and provided to the case member. On the other hand, a reinforcement rod member is provided at an upper end of the screen member. A small diameter portion is provided at both ends of the reinforcement rod member so that both ends of the reinforcement rod member are formed into a screen retainer portion. An inverted U-shaped receiver portion on which the screen retainer portion is laid is provided at a tip end of each screen support member. A fit portion fitted to the screen retainer portion laid on the receiver portion is provided to retain the screen retainer portion in a pull-apart prevented condition. Each screen support member is provided to be extendable or retractable. A retainer mechanism for retaining an extension/retraction condition of each screen support member is provided to the screen support member. Furthermore, leg member support members are respectively provided for supporting and maintaining the leg members extending downwardly in a suspended condition. A first end of each leg member support member is pivoted on the case member in the vicinity of a pivot portion of the corresponding leg member. A second end of each leg member support member is retained at the corresponding leg member. Furthermore, a flat ground contact portion is detachably provided on a bottom portion of the case member. The flat ground contact portion is provided to be received within the case member.

When the screen support member pivoted at the case member is angularly moved upwardly, the screen member received and wound in the screen winding receiver portion within the case member is drawn upwardly so that the screen member may be supported along the screen support members that have been angularly moved.

Also, when the leg members pivoted on the right and left sides of the case member are angularly moved downwardly and the case member is supported and held, the case member may be lifted at a desired height by the leg members. By the small amount of draw of the screen member, it is possible to sufficiently draw the screen member at the desired height.

Also, when the screen support members are pivotally moved to be attached to the case member 2 for the storage or transportation of the screen assembly, since the screen support members are located below the screen winding receiver portion, the width of the case member may be reduced.

With such an arrangement, it is possible to provide a reflex type screen assembly and a screen assembly which are simple in structure, superior in practicality and durability, low in cost, compact in size and superior in storage property and portability in comparison with the conventional example.

DETAILED DESCRIPTION OF THE PREFERRED EMBODIMENTS

One embodiment of the present invention will now be described with reference to the accompanying drawings.

Figure 1:
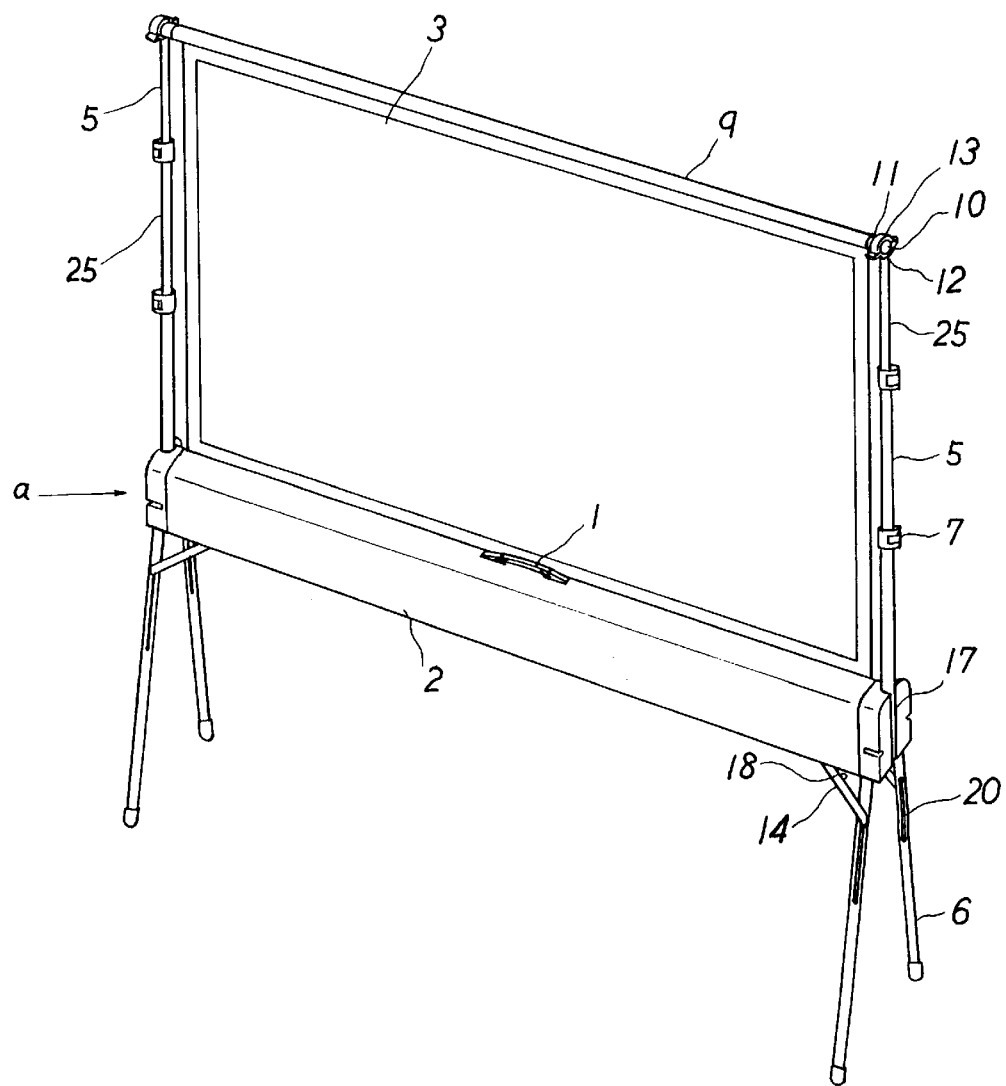
FIG. 1 is a perspective view showing a condition in use of a screen assembly according to an embodiment of the invention.

As shown in FIG. 1, in a reflex type screen assembly a which reflects a projection beam emitted from a projecting device such as a projector according to the embodiment, a screen winding receiver portion 4 (See FIG. 4) for winding and receiving a screen member 3 that has a flexibility is provided within a case member 2 having a grip portion 1. A pair of screen support members 5 each of which supports the screen member 3 when the screen support members 5 are drawn upwardly are pivoted on the right and left sides of the case member 2. On the other hand, leg members 6 are pivoted on the right and left sides of the case member 2. The leg members 6 are angularly moved downwardly to support and hold the case member 2.

Figure 4:
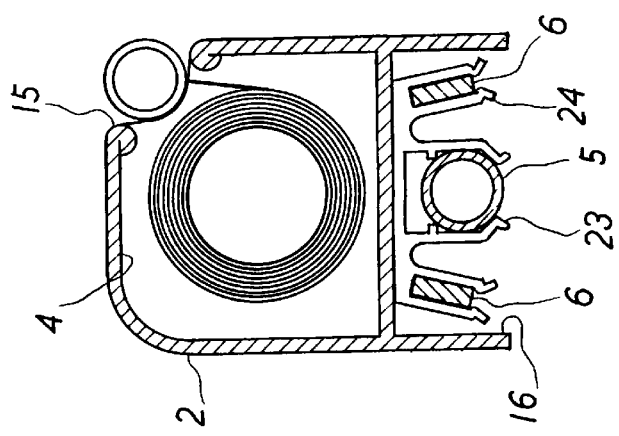
FIG. 4 is a cross-sectional view taken along the line IV—IV of FIG. 3.

As shown in FIG. 4, a drawing and opening portion 15 for drawing out and receiving the screen member 3 is provided at an upper portion of the case member 2. A screen winding and receiving portion 4 is formed within the drawing and opening portion 15.

A receiver recess portion 16 for fitting and receiving the screen support members 5 and the leg members 6 when the screen support members 5 and the leg members 6 are pivoted downwardly and received in the case member 2 is formed in a lower portion of the case member 2. Also, attachment/detachment retainer portions 23 and 24 for detachably retaining the received screen support members 5 and leg members 6 are provided in the receiver recess portion 16.

A flat surface is formed on a lower surface of the case member 2 so that the case member 2 is not swung or displaced when the case member 2 is laid on a floor or the like.

As shown in FIG. 1, a reinforcement rod member 9 is provided at an upper edge of the screen member 3 for preventing the screen member 3 from being deformed on the right and left sides.

A small diameter portion 11 is formed on each of the right and left ends of the reinforcement rod member 9. The end portion from the small diameter portion 11 of the reinforcement member 9 is provided at a screen retainer portion 10.

As shown in FIG. 4, the screen member 3 (See FIG. 1) is wound or received in the screen winding and receiving portion 4 within the case member 2 when the screen assembly a is stored or carried. In this storage condition, the reinforcement rod member 9 of the screen member 3 is retained under a laid condition in the drawing and opening portion 15.

Figure 9:
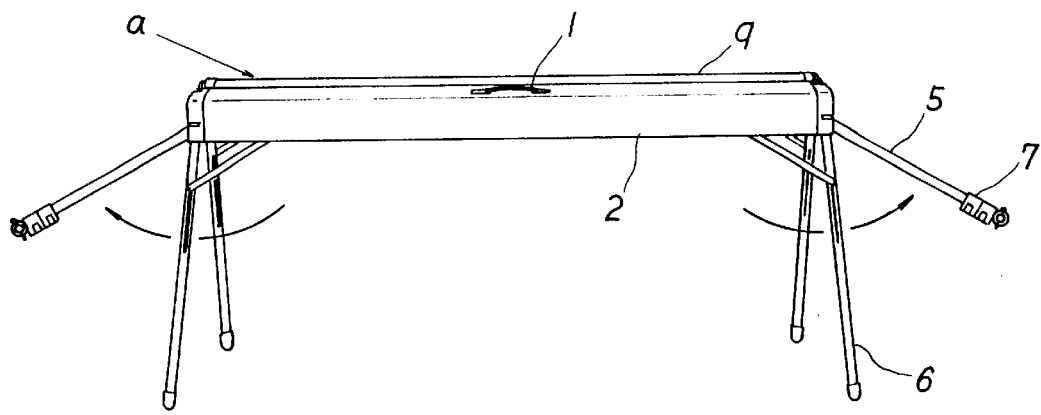
FIG. 9 is a side elevational perspective view showing the pivot operation of the screen support members according to the embodiment of the invention.
Figure 5:
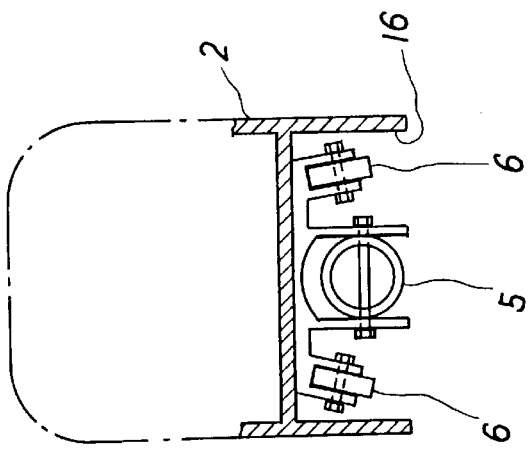
FIG. 5 is a cross-sectional view taken along the line V—V of FIG. 3.
Figure 7:
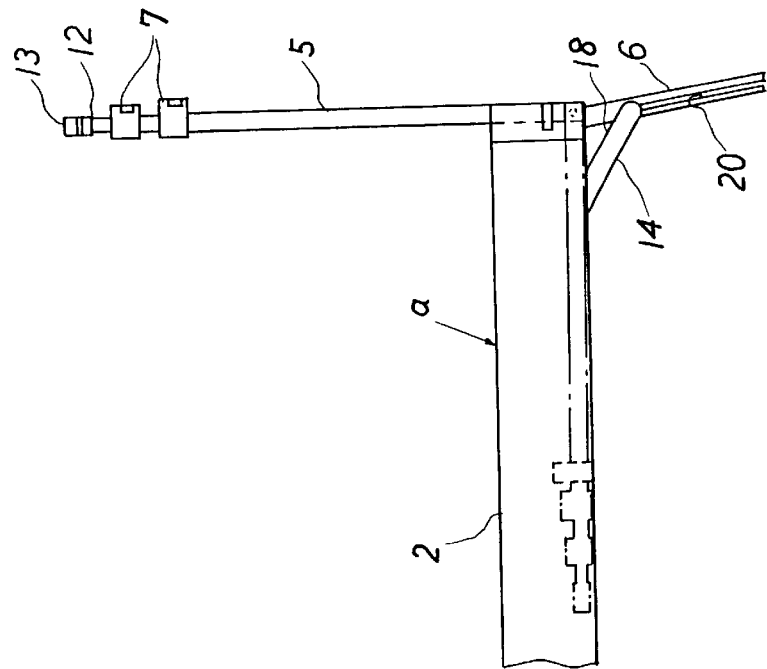
FIG. 7 is another enlarged side elevational view of the screen assembly according to the embodiment of the invention.

As shown in FIGS. 5, 7, 9, the screen support members 5 are pivoted on the right and left lower portions of the case member 2. When the screen support members 5 received in the receiver recess portion 16 are pivoted through about 270° upwardly and kept in an upright condition from the case member 2, the screen member 3 is retained by the screen support members 5. Incidentally, in the embodiment, a support member fitting portion 17 into which the screen support members 5 pivoted upwardly is fitted and retained is provided on each of the right and left sides of the case member 2, and the upright screen support members 5 are supported at the support member fitting portions 17. Accordingly, the screen support members 5 is prevented from falling down.

As shown in FIG. 1, each screen support member 5 is composed of a plurality of hollow rod members 25 slidably connected to each other so that when the hollow rod members 25 are slidably moved, the screen support member 5 is extended or retracted. Also, retainer mechanisms 7 are provided to the screen support member 5 for securely fixing the hollow rod members 25 to each other so that a length of each screen support member 5 may be maintained at a desired length by the retainer mechanisms 7.

An inverted U-shaped receiver portion 12 on which each screen retainer portion 10 of the screen member 3 is laid is provided at the end of each screen support member 5. A fit portion 13 fitted with the small diameter portion 11 laid on the receiver portion 12 for retaining the screen retainer portion 10 in a pull-apart prevented condition is pivoted at one end of the receiver portion 12. The screen retainer portion 10 of the screen member 3 laid on the receiver portion 12 of the screen support member 5 is prevented from being displaced on the right and left sides with the screen retainer portion 10 being retained at the receiver portion 12. Also, the screen retainer portion 10 is prevented also from moving up and down by the receiver portion 12 and the fit portion 13.

Figure 6:
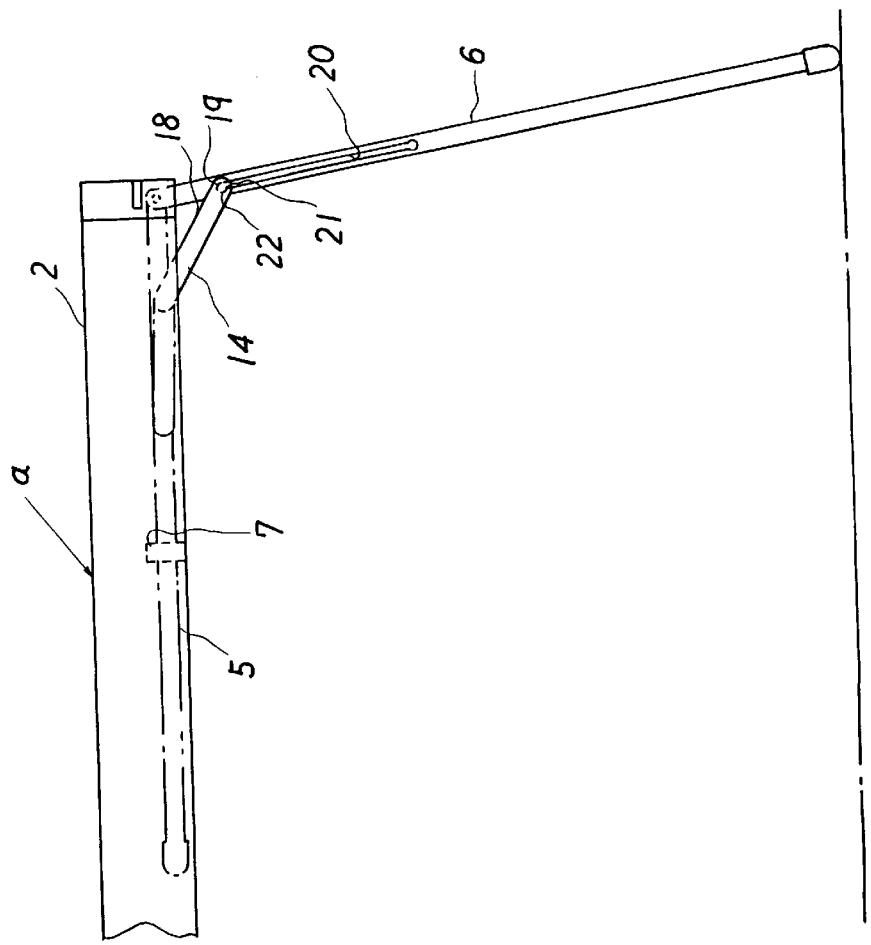
FIG. 6 is an enlarged side elevational view of the screen assembly according to the embodiment of the invention.

As shown in FIGS. 4, 5 and 6, the leg members 6 are pivoted on the right and left lower portions of the case member 2 and are provided so as to support and retain the case member 2 when the leg members 6 received in the receiver recess portion 16 is pivoted through about 90° downwardly from the case member 2.

Figure 8:
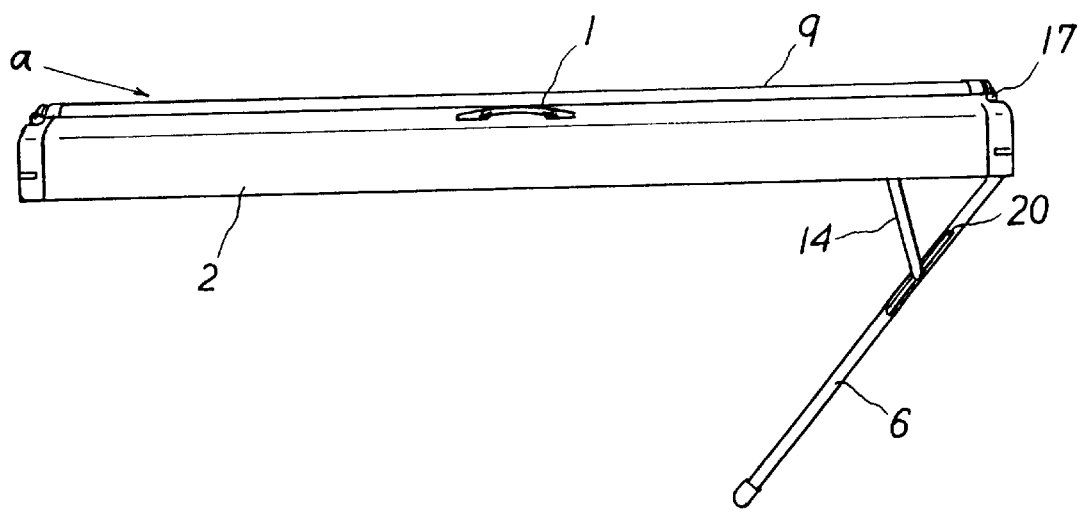
FIG. 8 is a side elevational view showing a pivot operation of the leg member according to the embodiment of the invention.

Also, as shown in FIGS. 6 and 8, in order to further ensure the retainment of the case member 2 by the leg members 6, a leg member support member 14 is pivoted in the vicinity of a pivot portion of each lower leg member 6 of the case member 2. A tip end of the leg member support member 14 is provided to be retainable at the leg member 6 that has been pivoted through about 90° downwardly. A triangle structure of the case member 2, the leg member 6 and the leg member support member 14 is used as a pivot preventing mechanism 18 to prevent the leg member support member 14 from pivoting.

Incidentally, in the embodiment, a projection 19 is formed at the tip end of the leg support member 14. On the other hand, a groove portion 20 which is engaged with the projection 19 to be slidable is formed in the leg member 6. A groove retainer portion 22 in which the projection 19 of the leg member 6 is retained and passed through a ride-over portion 21 provided in the vicinity of the tip end of the groove portion 20 when the leg member 6 is moved through about 90° downwardly is formed at the tip end of the groove portion 20. Accordingly, when the leg member 6 is pivoted downwardly, the projection 19 of the leg member support member 14 is slidably moved along the groove portion 20 of the leg member 6 and when the leg member 6 is pivoted until the case member 2 is supported and retained, the projection 19 of the leg member support member 14 rides over the ride-over portion 21 of the groove portion 20 so that the projection 19 is retained to the groove retainer portion 22. As a result, the leg member 6 and the leg member support member 14 are prevented from pivoting to each other. The case member 2 may be supported and retained without fail by the leg member 6. Also, when the projection 19 of the leg member support member 14 is moved on the side of the groove portion 20 while riding over the ride-over portion 21 of the groove portion 20, the leg member 6 may be pivoted again. Incidentally, it is possible to ensure the same effect in the case where the leg member support member 14 is pivoted to the leg member 6 and the tip end of the leg member support member 14 is retained to the case member 2.

Figure 3:
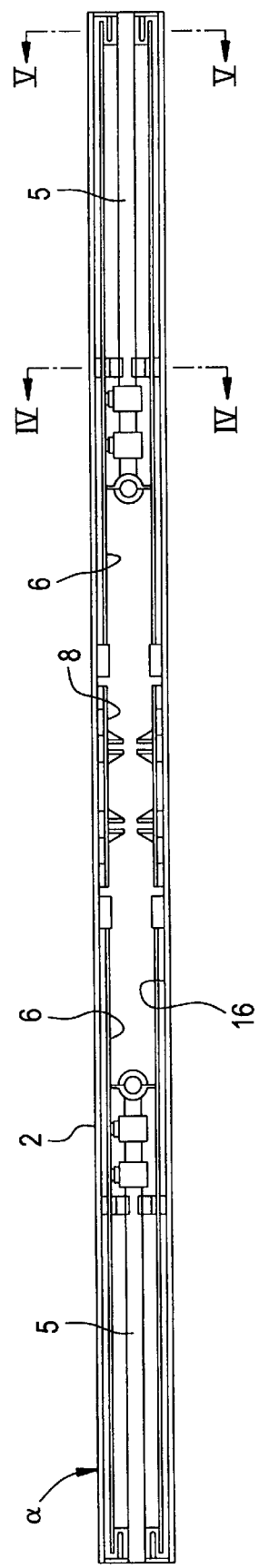
FIG. 3 is a bottom view showing the received condition of the screen assembly according to the embodiment of the invention.
Figure 12:
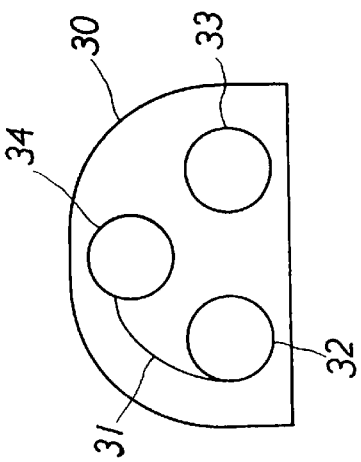
FIG. 12 is a cross-sectional view showing a conventional example.

Also, as shown in FIGS. 1 and 3, the leg members 6 are structured so as to support and hold the case member 2 by the inverted V-shape arrangement of the adjacent two leg members 6 when the leg members 6 are angularly moved downwardly. Also, when the leg members 6 are angularly moved upwardly and attached to the case member 2, the leg members 6 are received in the receiver recess portion 16 in the same manner as for the screen support members 5 so that the leg members 6 are not to project from the case member 2.

Figure 11:
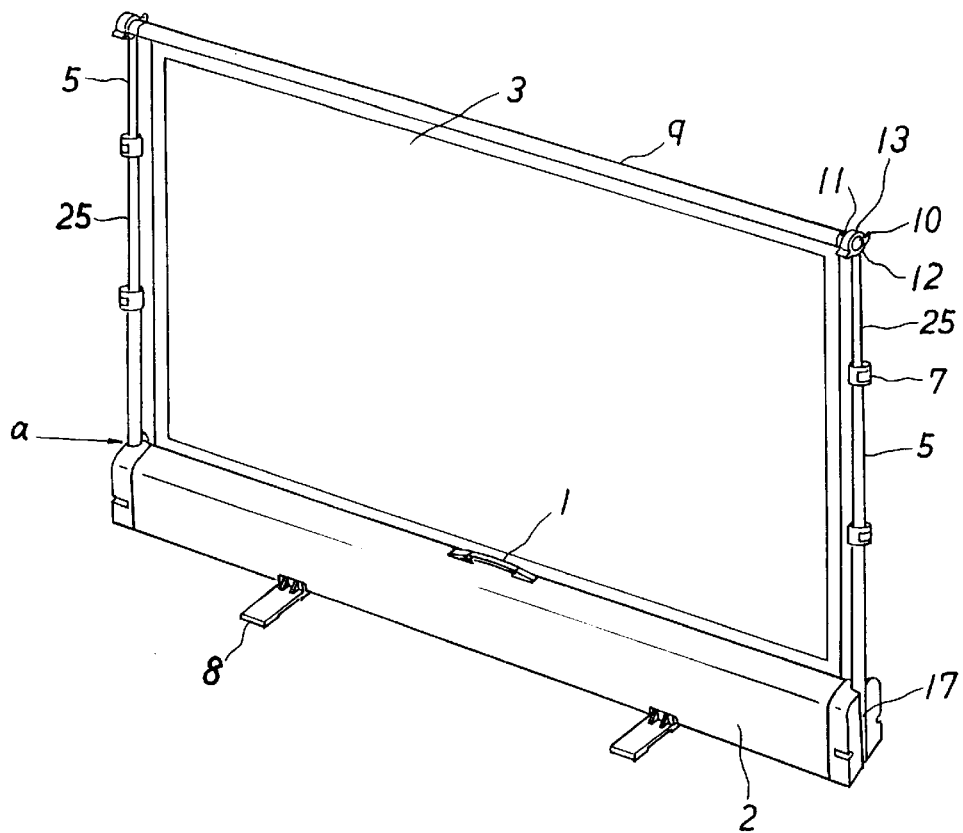
FIG. 11 is a perspective view showing another state in use according to the embodiment of the invention.
Figure 10:
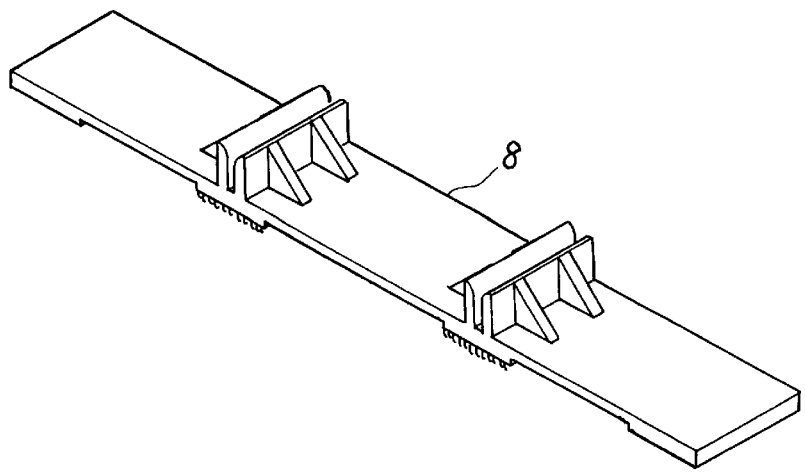
FIG. 10 is a perspective view showing a flat ground contact portion according to the embodiment of the invention.

Also, as shown in FIGS. 3, 10 and 11, a flat ground contact portion 8 which is detachable from the receiver recess portion 16 is received in the receiver recess portion 16 of the case member 2.

The flat ground contact portion 8 is always received in the receiver recess portion 16; however, in the case where the leg members 6 cannot be used (in the case where a base on which the screen is laid is fixed to the front face of the projector and so on), the flat ground contact portion 8 is mounted on a bottom portion of the case member 2 so that the overturn of the screen assembly a which has a center of gravity at a higher level resulting from the draw-out of the screen member 3 may be prevented.

A method for using the screen assembly according to this embodiment will now be described in detail.

As shown in FIGS. 1 and 3, in the case where the screen assembly a is to be carried or stored in a storage space, the screen member 3 is wound and received in the screen winding receiver portion 4 within the case member 2, and the screen support members 5 and the leg members 6 are angularly moved and received in the receiver recess portion 16.

Figure 2:
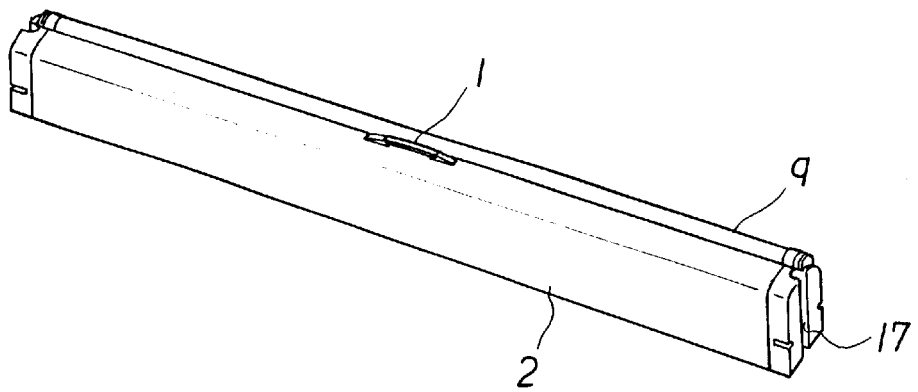
FIG. 2 is a perspective view showing a received condition of the screen assembly according to the embodiment of the invention.

As shown in FIG. 2, when the screen assembly a is to be carried, the person grips the grip portion 1 to carry. At this time, the screen support members 5 or the leg members 6 are not projected from the case member 2. Also, since the width of the case member 2 is small, the case member 2 is compact and easy to carry.

A method for assembling the screen assembly according to this embodiment will now be described in detail.

First of all, the screen assembly a is laid in a desired position.

Subsequently, as shown in FIGS. 6 and 7, the grip portion 1 is gripped and the case member 2 is lifted upwardly. The leg members 6 are drawn from the receiver recess 16 of the case member 2. The leg members 6 are angularly moved through about 90° and kept in the suspended condition to support and hold the case member 2. In this case, it is confirmed that the projection 19 of the leg member support member 14 rides over the ride-over portion 21 and is moved to the groove retainer portion 22 (that is, the leg members 6 are securely fixed).

Subsequently, the screen support members 5 are drawn out of the receiver recess portion 16 of the case member 2 and the screen support members 5 are angularly moved through about 270° to be provided in an upright condition above the case member 2.

Subsequently, as shown in FIG. 1, the screen member 3 is drawn upwardly from the screen winding and receiving portion 4 of the case member 2. Each small diameter portion 11 (the screen retainer portion 10) of the screen member 3 is laid on the receiver portion 12 of the screen support member 5. The fit portion 13 is fitted in the small diameter portion 11.

Subsequently, the screen support members 5 are extended upwardly. At the same time, the screen member 3 is further drawn upwardly. Thereafter, when the length of the screen support members 5 is fixed by the retainer mechanisms 7, the assembling work of the screen assembly a has been completed.

Incidentally, in the case where the respective members such as the screen support members 5 of the screen assembly a are received in the case member 2, the opposite work to that described above will be performed. Also, when the screen assembly a kept in the assembled condition is to be moved, the grip portion 1 of the case member 2 is gripped and the screen assembly a is moved in the lifted condition.

With such an arrangement according to the embodiment, it is possible to provide a screen assembly that is superior in receivability, portability and transportation property and that may be stored or carried under the compact condition that the screen member 3, the screen support members 5, the leg members 6 and the like are not projected from the case member 2.

Also, since the leg members 6 for supporting and retaining the case member 2 are provided to the case member 2, even if the screen member 3 is located at a higher level position, it is unnecessary to prepare a stand for locating the screen member at the high level position as in the conventional type assembly which is of a type in which the screen member is hooked at a tip end of the stand such as a tripod, or a table on which the screen member assembly a is laid. This contributes to the excellent practical use in comparison with the conventional screen assembly.

Also, as shown in FIG. 4, since the screen winding receiver portion 4 for winding and receiving the screen member 3 is provided in the upper portion of the case member 2, and the receiver recess portion 16 for receiving the screen support members 5, the leg members 6 and the like is provided in the lower portion of the case member 2, the case member 2 takes an upper and lower two-stage structure to make the width thereof smaller. Accordingly, it is possible to save the space for storage of the screen assembly a. In addition, it is possible to provide a screen assembly which may readily be carried and superior in storage property and portability.

Also, as shown in FIG. 6, when the leg members 6 are pivotally rotated through about 90° downwardly to support and retain the case member 2 by the leg members 6, the leg members 6 may readily be securely fixed without failure by the leg member support members 14 and the pivot preventing mechanisms 18. It is therefore possible to provide a screen assembly a which is superior in practical use and stability, and which may be laid on the floor in a stable condition, supported by the leg members 6.

Also, as shown in FIGS. 1 and 4, the screen member 3 may readily be drawn out by lifting up the reinforcement rod member 9 of the screen member 3 from the drawing and opening portion 15 of the case member 2. In addition, the drawn screen retainer portion 10 of the screen member 3 may readily be retained without fail at the receiver portion 12 and fit portion 13 of each screen support member 5. It is therefore possible to provide a screen assembly that is superior in practical use and workability, in which the screen member 3 may readily be located at a predetermined position.

Also, as shown in FIGS. 1 and 7, since the screen support member 5 is telescopic and its length may be maintained by the retainer mechanisms 7, when the large size screen member 3 is installed, after the screen retainer portion 10 has been retained at the receiver portion 12 and the fit portion 13 of each screen support member 5, the screen support member 5 is extended so that the screen member 3 may readily be installed at a height at which the person could not reach his or her hands while carrying out the work of the screen member 3 within his or her reach.

Also, as shown in FIGS. 10 and 11, since the flat ground contact portion 8 is provided as a discrete member on the bottom portion of the case member 2, it is possible to prevent the screen assembly a from turning over by the flat ground contact portion 8 in the case where the leg members 6 cannot be used. In the case where the leg members 6 are used, it is possible to provide the screen assembly in which the flat ground contact portion 8 may be received in the receiver recess portion 16 so as not to hinder the pivot motion of the leg members 6 and the screen support members 5 and which is superior in practical use and workability.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A screen assembly comprising:

a case member;

a screen member;

a screen winding receiver portion, for winding and receiving the screen member having a flexibility, disposed within the case member;

a pair of screen support members for supporting the screen member when the screen member is drawn upwardly, the screen support members being pivoted on the case member from a lower portion of right and left sides of the case member, and the screen support members being located below the screen winding receiver portion when the screen support members are swiveled around a pivotal portion to be attached to the case member.

2. The screen assembly according to claim 1, further comprising a plurality of leg members being pivoted on the right and left sides of the case member, and the leg members being angularly moved downwardly so that the case member is supported and retained.

3. The screen assembly according to claim 2, further comprising a plurality of leg member support members for respectively supporting and maintaining the leg members extending downwardly in a suspended condition, each of the leg member support members having a first end and a second end, wherein the first end is pivoted on the case member in the vicinity of a pivot portion of a corresponding one of the leg members, and a second end thereof is retained at the corresponding one of the leg members.

4. The screen assembly according to claim 2, wherein the screen support members and the leg members may be received in the case member.

5. The screen assembly according to claim 4, further comprising a plurality of leg member support members for respectively supporting and maintaining the leg members extending downwardly in a suspended condition, each of the leg member support members having a first end and a second end, wherein the first end is pivoted on the case member in the vicinity of a pivot portion of a corresponding one of the leg members, and a second end thereof is retained at the corresponding one of the leg members.

6. The screen assembly according to any one of claims 1 to 5, wherein each screen support member is operative to extended and retract, and a retainer mechanism for retaining an extension/retraction condition of each screen support member is provided to the screen support member.

7. The screen assembly according to claim 6, further comprising a flat ground contact portion disposed on a bottom portion of the case member, and the flat ground contact portion being a discrete member from the case member.

8. The screen assembly according to any one of claims 1 to 5, further comprising a reinforcement rod member disposed at an upper end of the screen member, and a screen retaining portion for being retained at each screen support member disposed at both ends of the reinforcement rod member.

9. The screen assembly according to claim 8, further comprising a small diameter portion disposed at both ends of the reinforcement rod member so that both ends of the reinforcement rod member are formed into the screen retainer portions, an inverted U-shaped receiver portion on which the screen retainer portion is laid, disposed at a tip end of each screen support member, and a fit portion fitted to the small diameter portion laid on the receiver portion to retain the small diameter portion in a pull-apart prevented condition.

10. The screen assembly according to claim 9, further comprising a flat ground contact portion disposed on a bottom portion of the case member, and the flat ground contact portion being a discrete member from the case member.

11. The screen assembly according to claim 8, further comprising a flat ground contact portion disposed on a bottom portion of the case member, and the flat ground contact portion being a discrete member from the case member.

12. The screen assembly according to any one of claims 1 to 5, further comprising a flat ground contact portion disposed on a bottom portion of the case member, and the flat ground contact portion being a discrete member from the case member.

13. A screen assembly according to claim 1, wherein said case member includes a bottom portion having said screen support members.

14. A screen assembly according to claim 1, wherein said case member includes a top portion having said screen winding receiver portion.

15. A reflex type screen assembly for reflecting a projection beam from a projecting device, said screen assembly comprising:

a case member;

a screen member;

a screen winding receiver portion, for winding and receiving the screen member having a flexibility, being provided within the case member;

a grip portion joined with the case member;

a pair of screen support members for supporting the screen member when the screen member is drawn upwardly, the screen support member being pivoted on the case member from a lower portion of right and left sides of the case member; and a plurality of leg members, the leg members being pivoted on the right and left sides of the case member, and the leg members being angularly moved downwardly so that the case member may be supported and retained.

16. A reflex type screen assembly for reflecting a projection beam from a projecting device said screen assembly comprising:

a case member;

a screen member;

a screen winding receiver portions for winding and receiving the screen member having a flexibility, disposed within the case member;

a grip portion joined to the case member;

a pair of screen support members for supporting the screen member when the screen member is drawn upwardly, the screen support members being pivoted on the case member from a lower portion of right and left sides of the case member;

a plurality of leg members extending downwardly being pivoted on the right and left sides of the case member;

the screen support members and the leg members being located below the screen winding receiver portion to be received in the case member and formed to have a length so as not to project from end portions of the case member when the screen support members and the leg members are pivoted and provided to the case member;

a reinforcement rod member disposed at an upper end of the screen member, a small diameter portion disposed at both ends of the reinforcement rod member so that both ends of the reinforcement rod member are formed into a screen retainer portion;

an inverted U-shaped receiver portion on which the screen retainer portion is laid, disposed at a tip end of each screen support member;

a fit portion fitted to the screen retainer portion laid on the receiver portion to retain the screen retainer portion in a pull-apart prevented condition;

each screen support member being operative to extend or retract;

a retainer mechanism for retaining an extension/retraction condition of each screen support member being provided to the screen support member;

a plurality of leg member support members for respectively supporting and maintaining the leg members extending downwardly in a suspended condition, each of the leg member support members having a first end and a second end, wherein the first end is pivoted on the case member in the vicinity of a pivot portion of a corresponding one of the leg members, and the second end thereof is retained at the corresponding one of the leg members;

a flat ground contact portion detachably provided on a bottom portion of the case member, and the flat ground contact portion being operative to be received within the case member.

* * * * *